April 5, 1938.　　　D. J. DESCHAMPS　　　2,113,017

PROPELLER SHAFT MOUNTING

Filed March 28, 1934

Inventor:
DESIRE J. DESCHAMPS,
by John H. Bruninga
His Attorney.

Patented Apr. 5, 1938

2,113,017

UNITED STATES PATENT OFFICE 2,113,017

PROPELLER SHAFT MOUNTING

Desiré J. Deschamps, Moline, Ill., assignor of one-half to Lewis B. Von Weise and Ellen M. Jacobi executers of the estate of P. De C. Ball, deceased Application March 28, 1934, Serial No. 717,705

5 Claims. (Cl. 308—189)

This invention pertains to a mounting structure for a propeller shaft. By a propeller shaft as used in this specification and the appended claims, is meant a drive shaft adapted for support in overhanging relation with reference to a bearing to carry a load mounted thereon outside of the bearing and subject to vibration stresses. The structure has been designed more particularly for the propeller shafts of airplanes, but it may be applied to other types of shafts operating under similar conditions.

In the mounting of a shaft of this type, a bearing is placed to support the shaft just inside of its load, such as a propeller, and the shaft projects beyond the bearing and carries the load in cantilever relation. As such a load is almost invariably subject to vibration, that portion of the shaft between the load and the bearing is subject to stresses set up by such vibration, which stresses may under certain circumstances be very great. In order to secure the shaft with relation to its bearing, various types of attachments have been used, most of which involve threading the shaft or otherwise undercutting it so as to provide attachment for the required fittings. Under such circumstances the undercutting of the shaft, such as the threads, has a tendency to weaken the same, and it has been found that cracks are very liable to develop at the root of such threads or undercuttings. Such cracks increase in depth under continued vibration and eventually the shaft fails, often with serious or fatal results.

One of the objects of this invention, therefore, is to provide a mounting of this type in which threading the shaft and similarly undercutting the same may be avoided.

Another object is to provide a mounting which is simple in construction, having few parts, and which may be securely locked in place.

Figure 1:
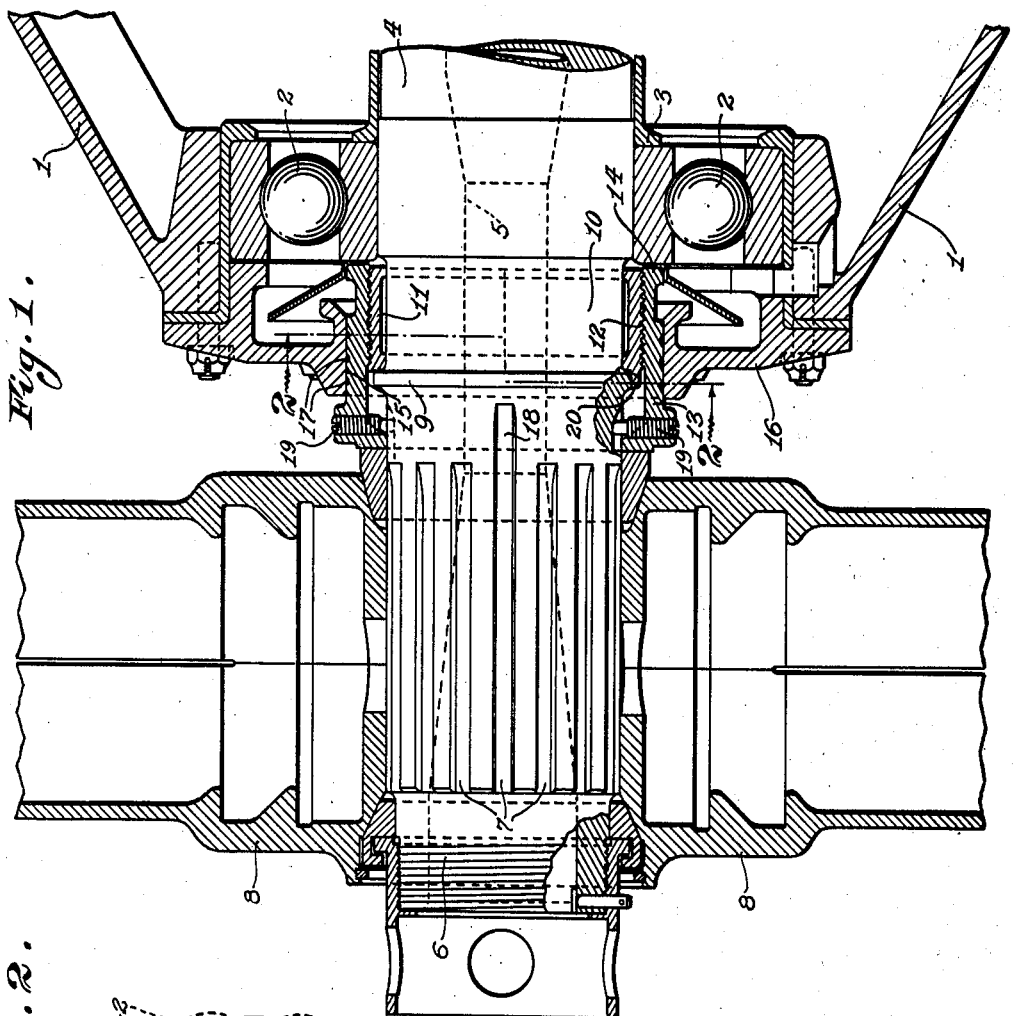
Figure 2:
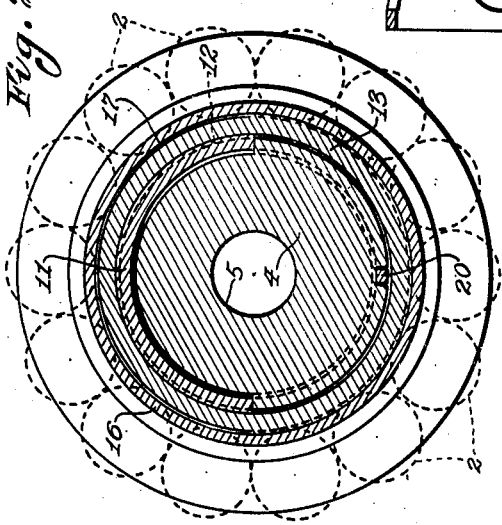

Further objects will appear from the following description, taken in connection with the accompanying drawing, in which:

Figure 1 is a longitudinal sectional view of a mounting for an airplane propeller embodying this invention; and Figure 2 is a transverse section on line 2—2 of Figure 1.

Referring to the drawing, 1 designates the housing or engine frame, in which the shaft is mounted. Suitably seated in the frame 1 is a bearing 2, which in the structure shown is a ball bearing. This bearing is seated against a suitable shoulder 3 formed on or attached to the propeller shaft 4. The shaft 4 is usually hollow, the bore thereof being indicated at 5. Its outer end 6 is usually provided with splined grooves 7 adapted to key the propeller hub 8 against rotation thereon.

In order to secure the bearing 2 in its seat against the shoulder 3, a shoulder 9 is formed on the shaft 4 by providing a reduced portion 10 in the periphery of the shaft. The shoulder 9 joins the reduced portion 10 by a fillet of ample radius so as to avoid a sudden change of section, which might tend to produce a crack. Arranged to seat in the reduced portion or groove 10 is a split sleeve 11. This sleeve is split diametrically so as to provide, when assembled, a ring embracing the shaft 4 at the reduced portion 10. This sleeve is provided on its outer surface with threads 12. A nut 13 is arranged to be threaded on the sleeve 11 so as to be screwed up into abutment with the bearing 2 and to force the latter against the shoulder 3. When the sleeve 11 has been assembled on the shaft, the nut 13, when screwed thereon, retains the sleeve 11 in assembled relation. When the nut 13 is screwed up against the bearing, the sleeve 11 is forced against the shoulder 9. This sleeve, therefore, provides an anchor engaging this shoulder and retained thereby, while the nut provides means braced against this anchor and which is provided with a shoulder 14, which may be strained against the bearing 2. The nut 13 may be provided with an outer cylindrical surface 15 fitting the bore of the retaining ring 16 which secures the bearing 2 in the frame 1. Suitable packing grooves 17 may be provided to prevent the escape of oil from the housing.

In order to lock the nut 13 against unscrewing from the sleeve 11, certain of the splined grooves 7 on the shaft are extended rearwardly, as indicated at 18. The nut 13 is then provided with one or more set screws 19, the ends of which are seated in these extension grooves 18. This construction avoids drilling holes in the shaft in accordance with prior practice, as such holes have been found to have a tendency to start cracks. The extensions 18 have a gradually tapering depth toward the rear, so that there is no sudden change of section in the shaft material. Accordingly the tendency to produce cracks is greatly diminished, if not actually eliminated entirely.

The sleeve 11 is provided with an extension 20 in the form of a protruding dog, and the shoulder 9 is provided with a notch adapted to receive this dog so as to secure the sleeve 11 against rotation when screwing up the nut 13.

It will be seen that this invention provides a structure whereby the shaft may be securely fixed in its bearing 2 without the necessity of undercutting the shaft in such a manner as to provide sudden changes of cross-section and the consequent tendency to produce cracks and thereby invite failure of the shaft. The sleeve 11 provides a simple form of anchor which may be assembled around the shaft and which seats against the shoulder 9. The latter shoulder has fillets on both sides and the sleeve 11 is arranged to fit the fillet on the inward side. The nut 13 then provides means which may be braced against the anchor 11 and which may be forced rearwardly to abut the bearing 2 and retain the latter securely in place on the shaft.

It is not indispensable that the sleeve 11 should fit exactly between the shoulder 9 and inner race of the bearing 2. In fact, it is advantageous to allow a substantial clearance here. This avoids the necessity of a "selective fit" between these parts which is always bothersome and expensive in production work. The anchor sleeve 11 and the nut 13, acting in combination, provide adjustable means which may be braced against the shoulder 9 and adjusted to bear against the bearing 2 so as to lock these parts securely in their proper relation.

While this invention has been described as embodied in a unitary structure, it will be understood that individual features or sub-combinations thereof may be useful by themselves without reference to other features or the complete combination. It is understood that the use of such individual features or sub-combinations is contemplated by this invention and is within the scope of the appended claims. It is further obvious that various changes may be made, within the scope of the appended claims, in the details of construction without departing from the spirit of this invention; it is to be understood, therefore, that this invention is not limited to the specific details shown and/or described.

Having thus described the invention, what is claimed is:

1. A propeller mounting comprising, in combination, a supporting frame, a shaft-supporting bearing therein, a propeller-shaft mounted in said bearing and having a hub-receiving portion extending outwardly from said bearing and unsupported therebeyond, said outwardly extending portion of said shaft having a shoulder between said bearing and said hub-receiving portion, said shoulder rising from the body of said shaft by rounded fillets, said shaft being free of sharp changes in diameter in the regions outwardly of said bearing, a split collar embracing said shaft between said bearing and said shoulder so as to bear against the latter, and a retaining sleeve surrounding said collar to retain the same in assembled relation and braced against said collar and said bearing.

2. In a structure of the character described, a supporting frame, a shaft-supporting bearing therein, a propeller-shaft mounted in said bearing and having a hub-receiving portion extending outwardly from said bearing and unsupported therebeyond, said hub-receiving portion having key means to retain a propeller against rotation thereon, a shoulder outstanding from said shaft beyond the normal diameter of said outwardly extending portion between said bearing and said hub-receiving portion, an externally threaded split collar embracing said shaft between said bearing and said shoulder so as to bear against the latter, a retaining sleeve threaded on said collar and braced against said collar and said bearing, and means engaging said key means to lock said retaining sleeve.

3. A propeller mounting comprising in combination, a supporting frame, a shaft-supporting bearing therein, a propeller shaft mounted in said bearing and having a hub-receiving portion extending outwardly from said bearing and unsupported therebeyond, a shoulder outstanding from said shaft beyond the normal diameter of said outwardly extending portion between said bearing and said hub-receiving portion, said shoulder rising from the body of said shaft by a rounded fillet, whereby the shaft is free from sharp changes in diameter in the regions outwardly of the bearing, and retaining means for said bearing braced against said shoulder.

4. A propeller mounting comprising, in combination, a supporting frame, a shaft-supporting bearing therein, a propeller shaft mounted in said bearing and having a hub-receiving portion extending outwardly from said bearing and unsupported therebeyond, a shoulder outstanding from said shaft beyond the normal diameter of said outwardly extending portion between said bearing and said sub-receiving portion, but sized to pass through said bearing said shoulder rising from the body of said shaft by a rounded fillet, whereby the shaft is free from sharp changes in diameter in the regions outwardly of the bearing, and retaining means for said bearing braced against said shoulder.

5. In an air-craft power plant, in combination a supporting bearing, a propeller shaft mounted in said bearing and extending outwardly therebeyond to receive a propeller, the outwardly extending portion of said shaft having a filleted shoulder rising therefrom, said outwardly extending portion of said shaft being free of sharp changes in diameter, an externally threaded split collar bearing against said shoulder, and a retaining sleeve threaded on said collar and adjustabe thereon against said bearing to retain said shaft in said bearing.

DESIRÉ J. DESCHAMPS.